United States Patent [19]

Ramusino

[11] 4,354,404
[45] Oct. 19, 1982

[54] ARRANGEMENT FOR INCREASING THE PRECISION OF A MACHINE TOOL

[75] Inventor: Francesco C. Ramusino, Milan, Italy
[73] Assignee: Innocenti Santeustacchio S.p.A., Franchi, Italy
[21] Appl. No.: 114,696
[22] Filed: Jan. 23, 1980

[30] Foreign Application Priority Data

Mar. 27, 1979 [IT] Italy ............................ 21346 A/79

[51] Int. Cl.³ .................. B23B 3/10; B23B 11/00
[52] U.S. Cl. .................................. 82/2 D; 408/11; 408/13; 408/16
[58] Field of Search ........... 82/2 B, 2 D; 408/237, 408/235, 13, 11, 8, 16; 409/237, 238

[56] References Cited

U.S. PATENT DOCUMENTS

| | | | |
|---|---|---|---|
| 3,548,172 | 12/1970 | Centner et al. | 82/2 B |
| 3,730,051 | 5/1973 | Hatzig | 409/238 |
| 3,967,515 | 7/1976 | Nachtigal | 82/2 B |
| 3,988,965 | 11/1976 | Cayen et al. | 409/237 |
| 4,131,837 | 12/1978 | Whetham | 408/11 |
| 4,157,231 | 6/1979 | Phillips | 408/13 |
| 4,178,834 | 12/1979 | Holstrom | 408/8 |

Primary Examiner—Leonidas Vlachos
Attorney, Agent, or Firm—Birch, Stewart, Kolasch & Birch

[57] ABSTRACT

A machine tool is provided with an arrangement for increasing its precision by compensating for deviations in tool positioning caused by factors, such as elastic deformation of the machine structure, which vary in their effect in dependence on the current working state of the machine tool. The arrangement includes a compensator device arranged to physically act upon the machine tool to cancel at least one deviation component, and signal processing means controlling the action of the compensator device in dependence on the current machine working state as sensed by a plurality of transducers. The signal processing means stores data interrelating the machine working state to a corresponding appropriate magnitude of action of the compensator device.

7 Claims, 2 Drawing Figures

ARRANGEMENT FOR INCREASING THE PRECISION OF A MACHINE TOOL

BACKGROUND OF THE INVENTION (1) Field of the Invention

The present invention relates to an arrangement for increasing the precision of a machine tool and finds particular utility in relation to a machine tool of large dimensions.

(2) Description of the Prior Art

In machine tools, in order to obtain workpieces within the tight dimensional tolerances that are nowadays required, the position assumed by the tool relative to the workpiece as a result of displacements of the various carriages of the machine tool along their respective coordinate axes, must coincide with the desired position of the tool.

In known machine tools currently in use, the position assumed by the tool relative to the workpiece deviates from the desired position due to a number of factors prime among which is the elastic deformation of parts of the machine tool. The magnitude of this deviation is dependent on the values of various parameters characterizing the current working state of the machine tool (such parameters include the coordinate positions of the carriages).

Another cause of such deviations lies in thermal deformations in the structure of the machine tool arising from uneven heating and/or cooling of its parts; the magnitude of such deformations will depend on the temperatures of various points of the machine tool itself. A further cause lies in wear of the tool, so that its operative point is not in the desired position.

Yet another cause of undesired deviations between the desired and actual positions of the tool, is that during assembly the machine tool structure may experience geometric errors due to misalignments and errors in perpendicularity for example.

These deviations, which in general have linear components and angular components, are particularly significant in large machine tools and result in the production of workpieces with faults in parallelism and perpendicularity.

Various arrangements have been suggested to prevent such deviations and include auxiliary stiffening structures, mobile counterweights and/or mechanical compensator devices responsive to a control signal generated by members of the machine tool itself, thermal conditioning systems associated with the machine tool itself and/or the environment in which the machine tool is installed, and adjustment devices providing predetermined adjustments to the parallelism and perpendicularity between the axes of carriage movement.

These arrangements are not entirely satisfactory in that they act to reduce the deviations by removing individually only the particular cause that is possible for the arrangement to remove. They also generally have the disadvantage of being complicated and result in a considerable increase in the size and the cast of the machine tool.

It is therefore an object of the present invention to provide an improved arrangement for increasing the precision of a machine tool.

SUMMARY OF THE INVENTION

According to one aspect of the invention, there is provided a machine tool installation in which the tool of a machine tool is positioned relative to a workpiece by displacement of a carriage means for the machine tool to coordinate positions intended to correspond to a desired tool position. The installation includes an arrangement for at least partially compensating for any deviation between the actual and desired tool positions such as caused by elastic deformation in the machine tool, said deviation being composed of component deviations the magnitudes of which are dependent on the current working state of the machine tool. The arrangement includes:

a device arranged to physically act upon the machine tool to cause displacements in the position of the tool relative to the workpiece, the magnitudes of said displacements being dependent on the value of a control signal fed to said device, transducers attached to the machine tool and arranged to generate output signals representing the values of a number of parameters characterizing the working state of the machine tool, the parameters including the coordinate positions of said carriage means, and signal processing means connected to receive said output signals from said transducers and including memory means arranged to store predetermined data interrelating values of said parameters representing the machine working state with values of said control signal appropriate to cause said device to cancel at least one said component deviation, said processing means being arranged to monitor the current values of said working state parameters as represented by said output signals and to derive therefrom, by utilising said stored data, the current appropriate value of said control signal, and the said processing means further including output means operative to output said control signal with its value set to said current appropriate value.

According to another aspect of the present invention, there is provided an arrangement for increasing the precision of a machine tool by compensating for deviations in tool positioning caused by factors which vary in their effect in dependence on the current working state of the machine tool. The arrangement includes:

means responsive to an input control signal fed thereto to physically act upon the machine tool in a manner such as to cancel at least one component of said deviation, sensor means connected to said machine tool and arranged to generate output signals representative of the current working state of the machine tool, processing means connected to receive said output signals and including memory means arranged to store predetermined data interrelating said working state parameter values with corresponding control signal values appropriate to cause the cancellation of said at least one component, the processing means being operative to utilise said predetermined data to form said control signal with a value appropriate for the current working state of the machine tool as represented by said transducer output signals, and means feeding said control signal from said processing means to said means physically acting on the machine tool.

BRIEF DESCRIPTION OF THE DRAWINGS

An arrangement, embodying the invention, and for increasing the precision of a machine tool will now be particularly described by way of example, with reference to the accompanying diagrammatic drawings, in which.

DESCRIPTION OF THE PREFERRED EMBODIMENT

Figure 1:
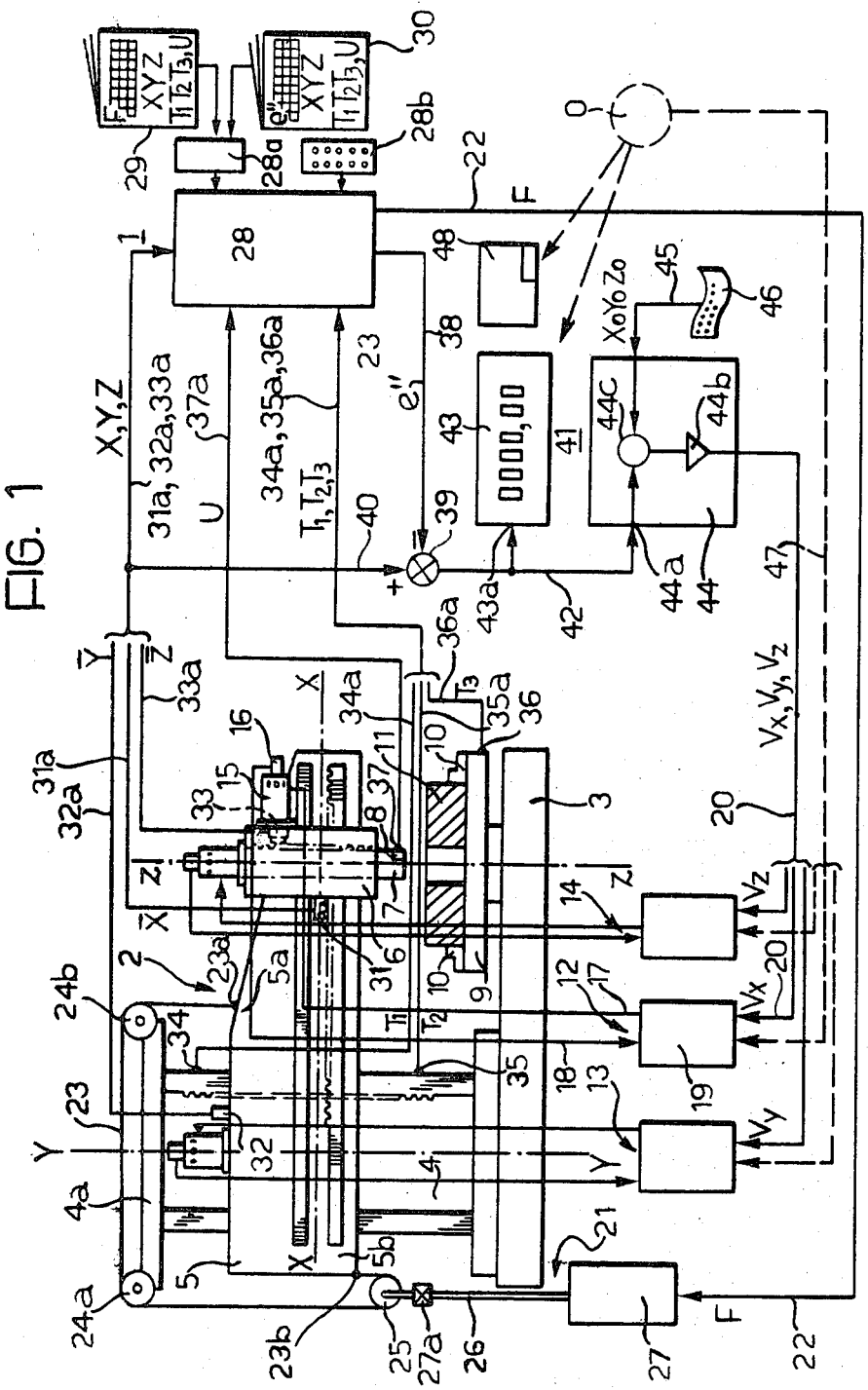
FIG. 1 shows a machine tool installation with a machine tool and said arrangement for increasing the precision of the machine tool.

Shown in FIG. 1 is a machine tool installation in which a machine tool 2 of large dimensions is provided with an arrangement 1 for increasing the precision of the machine tool by compensating for deviations in tool positioning resulting from factors such as elastic deformation of the machine tool 2, thermal effects, and wear of the tool 8.

The machine tool 2 comprises a base 3, an upright 4 mounted on the base 3, a horizontal crosspiece 5 vertically movable up and down the upright 4, a head 6 movable horizontally along crosspiece 5, and a tubular element 7 mounted for vertical movement on the head 6 and carrying a tool 8. The machine 2 further comprises a platform 9 which is rotatably mounted on the base 3 and upon which a workpiece 11 can be secured by clamps 10.

The head 6, crosspiece 5 and element 7 constitute movable carriages of the machine tool which can be displaced along respective axes, shown as x—x, y—y, z—z to take up respective coordinate positions X, Y, Z. By controlling the positions of the carriages 5, 6 and 7 the tool 8 is engaged with the workpiece 11 as required.

The carriages 5, 6 and 7 are controlled by respective direct-current drives 12, 13, 14, of known type. For the sake of brevity only the drive 12 will be described, the drives 13 and 14 being of similar form. The drive 12 includes a direct current motor or mechanical force generator 15, and a tachometer 16, which are connected via respective lines 17, 18 to a drive control unit 19. The unit 19 is supplied over a line 20 with an electrical signal representing a 'demand' speed of Vx for the carriage 6.

Figure 2:
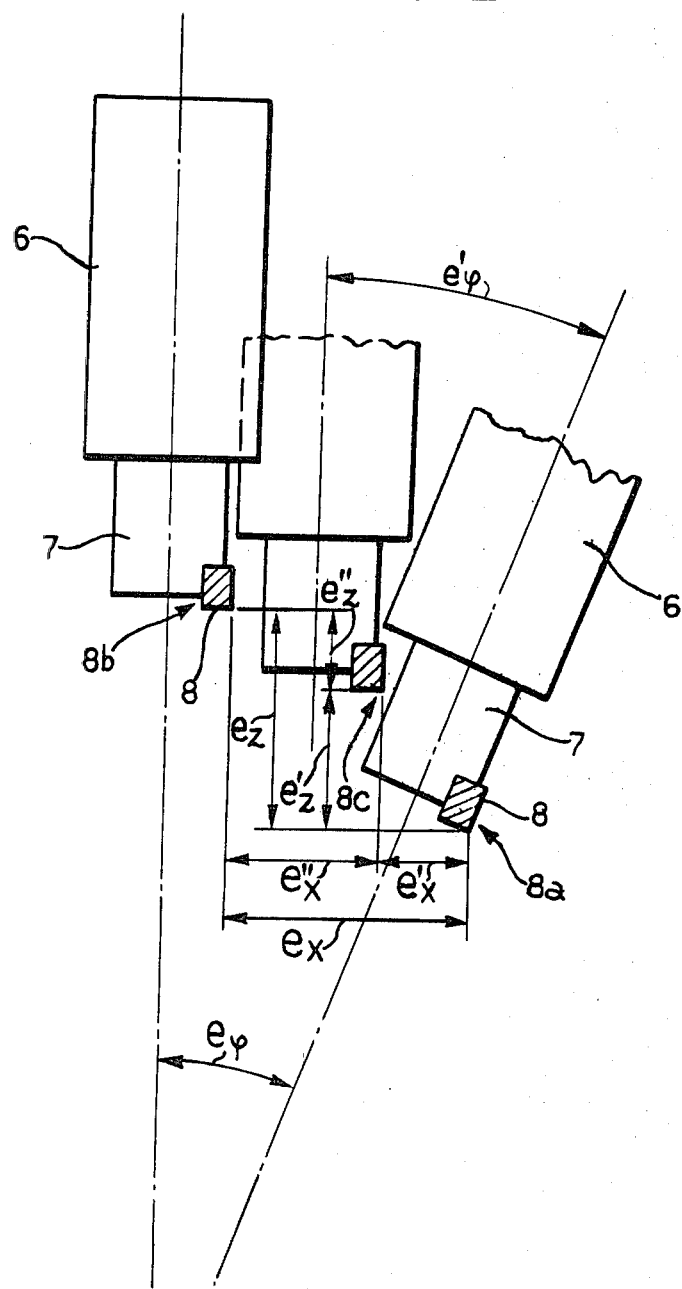
FIG. 2 shows a detail of FIG. 1 to an enlarged scale.

With reference to FIG. 2, the actual position assumed by tool 8 when the carriages 5, 6 and 7 are positioned according to respective coordinates X, Y, Z is shown at 8a. The position of the tool 8 shown at 8b is the ideal or desired position that the tool 8 would assume with the carriages at coordinates of X, Y, Z if the machine tool were exempt from effects such as elastic and thermal deformations, tool wear and errors in alignment and perpendicularity.

The difference between the actual position 8a and the desired position 8b of the tool 8 can be quantified by three linear deviations $e_x$, and $e_z$ (along the axes x—x, and z—z respectively) and an angular deviation $e_\psi$.

The magnitude of these deviations will depend on the current working state of the machine tool as defined by various parameters including the coordinate positions of the carriages 5, 6 and 7, the temperatures of the machine parts, and the tool wear.

The compensation arrangement 1 includes a mechanical compensator device 21 for physically acting upon the machine tool 2 to compensate for deformations of the machine. The device 21 is controlled by a control signal fed to the device 21 over line 22. In response to the control signal F the device 21 is arranged to produce displacements $e'_x$, $e'_z$, $e'_\psi$ in the position of the tool with the angular displacement $e'_\psi$ cancelling the deviation $e_\psi$.

The device 21 comprises a cable 23 fixed at one end 23a to the mid-point 5a of the crosspiece 5, and at its other end 23b to a point 5b on the end of the crosspiece 5 furthest away from head 6. The cable 23 passes around two pulleys 24a and 24b fixed to a support structure 4a mounted on top of the upright 4, and a pulley 25 carried by the piston rod of a hydraulic cylinder 26. By appropriate operation of the hydraulic cylinder 26, the cable 23 can be tensioned as desired.

The force exercised by hydraulic cylinder 26 is determined by an electrohydraulic apparatus 27 of known type, to which the control signal F is fed. A force transducer 27a is positioned at the end of cylinder 26 to permit closed loop control of the tensioning of the cable 23 in accordance with the signal F.

The compensation arrangement 1 also has a signal processing unit 28 provided with input devices constituted by a reader 28a and a keyboard 28b. This unit 28 includes a memory arranged to store a number of parameter value sets representing separate predetermined machine states, together with a number of corresponding values of the said control signal F, experimentally and/or analytically determined. These values of the signal F (recorded in tables 29) are initially fed into the unit 28 through the said input devices.

Position transducers 31, 32, 33, of known type, are fixed to the machine tool 2 in order to monitor the actual values $\overline{X}$, $\overline{Y}$, $\overline{Z}$ of the coordinates X, Y, Z of the movable carriages 5, 6, 7. In addition, temperature transducers 34, 35, 36, are provided to monitor the temperatures T1, T2, T3 at predetermined points on upright 4 and on the platform 9. A transducer 37 is also provided to measure the wear U of the tool 8.

The output signals from the above-mentioned transducers 31 to 37 are sent over lines 31a to 37a respectively, to the unit 28 where they are compared with the stored sets of parameter values characterizing the said predetermined machine working state; as a result of this comparison, the unit 28 derives (by interpolation between stored values of the control signal F) the value of control signal F appropriate to the existing working state of the machine tool 2. Output means of the unit 28 serve to output the control signal F with this derived appropriate value.

In response to the signal F, the compensator device 21 acts to displace the tool 8 from the position 8a to a position 8c by bringing about displacements $e'_x$, $e'_z$, $e'_\psi$. The angular displacement $e'_\psi$ is of such a magnitude that it cancels the deviation $e_\psi$. Following the operation of the device 21, the position 8c of the tool 8 deviates from position 8b through residual deviations $e''_x$ and $e''_z$.

The unit 21 is also arranged to memorize for each of the said predetermined machine working states, the values of the remaining uncancelled residual deviations $e''$. These values, experimentally and/or analytically determined, are recorded in tables 30 and are initially fed into the unit 28 via the reader 28a or keyboard 28b. The values $e''_x$, $e''_z$ of the remaining uncancelled residual deviations corresponding to the existing machine working state are output from the unit 28 on line 38.

The arrangement 1 further comprises subtractor means 39, fed via the line 38 with the values of the remaining residual deviations $e''_x$, $e''_z$, and via a line 40 with the position coordinate values $\overline{X}$, $\overline{Y}$, $\overline{Z}$ of the movable carriages 5, 6 and 7.

The subtractor means 39 determines the algebraic differences between the values $\overline{X}$, $\overline{Y}$, $\overline{Z}$ and the values e" and outputs corresponding difference signals which represent carriage coordinate feedback values.

The arrangement 1 also comprises a controller 41 connected to receive said difference signals over a line 42. The controller 41 is arranged to enable the drives 12, 13 and 14 to be controlled manually or automatically to adjust the positions of the carriages 5, 6 and 7 such that the residual deviations e" are cancelled out.

The controller 41 includes a display unit 43 whose input 43a is connected to receive said difference signals from the line 42. In addition, the controller 41 includes a numerically controlled governing unit 44 having a feedback input 44a receiving said difference signals and a 'demand' input receiving said programmed values $X_o$, $Y_o$, $Z_o$ of the coordinates X, Y, Z of the carriages 5, 6 and 7 via line 45. These values $X_o$, $Y_o$ and $Z_o$ are recorded on a punched tape 46.

The operation of the compensation arrangement 1 will now be described.

Initially the values of the control signal F appropriate to cancel the angular deviation $e_\psi$ for particular machine working states are determined either experimentally (by means of measurements taken for a number of different machine working states) or analytically and these values of the signal F are stored in the memory of the unit 28 together with the corresponding sets of working state parameter values. In addition, experimentally or analytically determined values of the residual deviations e" are also stored in the unit 28.

During working of the machine tool, the transducers 31 to 37 send to the unit 28 signals representing the current values of various of the working state parameters of the machine tool (including the carriage coordinate positions $\overline{X}$, $\overline{Y}$ and $\overline{Z}$). By comparison and interpolation, the unit 28 outputs the control signal F with a value appropriate to cause cancellation of the angular deviation $e_\psi$; in addition, the unit 28 also outputs to the subtractor means 39 signals representing values of the residual deviations e".

Instead of memorizing the interrelation between the machine tool working state and the appropriate value of the signal F in terms of a number of sets of parameter and signal values, the unit 28 can be arranged to store this interrelationship in terms of a formula expressing the value of signal F as a function of the working state parameter values, (in this case, the memory of the unit 28 could simply take the form of presettable electronic components, such as potentiometers, set to represent particular coefficients of a predetermined formula-the unit 28 would thus be in effect an analogue computer). During working of the machine tool, the current values of the working state parameters are combined in accordance with this formula to derive the appropriate value of the control signal F. The determination of the values of the residual deviations e" by the unit 28 can also be carried out using predetermined formulae held in the memory of the unit 28.

The signals representing the residual deviation values e" are subtracted in the subtractor means 39 from the signals representing the measured carriage coordinate values and the resultant difference signals are fed via the line 42 to the display unit 43 and to the unit 44.

Operator-controlled correction for the residual deviations e" can be effected by an operator, positioned at 0, controlling the carriage drives 12, 13 and 14 (through any conventional type of control indicated by the dotted line 47), in a manner to bring the readings displayed on the unit 43 into correspondence with desired carriage coordinate values read from a drawing 48. Since the displayed readings represent the carriage coordinates adjusted by the residual deviations e", the tool 8 will effectively assume the desired position 8b when the displayed readings correspond to the desired coordinates indicated on the drawing 48.

Automatic correction for the residual deviations e" can be effected by the numerically controlled governing unit 44, which is arranged to output signals $V_x$, $V_y$, $V_z$, via the line 20 to the carriage drives 12, 13 and 14. The signals $V_x$, $V_y$, $V_z$ are obtained by amplifying in an amplifier 44b the signal output from a difference unit 44c which subtracts the feedback carriage coordinate values (represented by the difference signals fed to the input 44a) from the programmed carriage coordinate values $X_o$, $Y_o$, $Z_o$. Since the feedback values are adjusted by the residual deviations e", the tool 8 will effectively assume the desired position 8b.

The residual deviations e", instead of being used to adjust the measured coordinate values X, Y, Z can of course be used to adjust the programmed values $X_o$, $Y_o$, $Z_o$. In this case the measured values X, Y, Z are fed directly to the feedback input of the unit 41 while the said residual deviations e" are summed with the programmed values $X_o$, $Y_o$, $Z_o$ and the resultant values fed to the 'demand' input of the unit 41.

The described compensating arrangement 1 substantially increases the precision of the machine tool 2 by effecting an overall elimination of the deviations between actual and desired tool positions. The described arrangement 1 is neither unduly large or expensive.

I claim:

1. In a machine tool installation in which the tool of a machine tool is positioned relative to a workpiece by displacement of carriage means of the machine tool to coordinate positions intended to correspond to a desired tool position, an arrangement for at least partially compensating for deviation between the actual and desired tool positions such as caused by elastic deformation in the machine tool, said deviation being composed of component deviations the magnitudes of which are dependent on the current working state of the machine tool, said arrangement comprising:

a mechanical force generator arranged to physically act upon the machine tool to cause displacements in the position of the tool relative to the workpiece, the magnitudes of said displacements being dependent on the value of a control signal fed to said mechanical force generator, transducers attached to the machine tool and arranged to generate output signals representing the values of a number of parameters characterizing the angular and linear working state of the machine tool, said parameters including the coordinate positions of said carriage means, and electronic signal processing means connected to receive said output signals from said transducers and including memory means arranged to store predetermined data interrelating values of said parameters representing the machine working state with values of said control signal appropriate to develop working state parameters and cause said mechanical force generator to cancel said component deviation, said predetermined data interrelating values being determined values of the machine working state dependent on particular working conditions, said processing means being arranged to monitor the current values of said working state parameters as represented by said output signals and to derive therefrom the current appropriate value of said control signal, by utilizing and comparing the current values of said stored data, and the said processing means further including output means operative to output said control signal with its value set to said current appropriate value to control said mechanical force generator and compensate for both angular and linear displacements of the machine tool.

2. The compensating arrangement claimed in claim 1, wherein the said memory means of said signal processing means is arranged to store sets of parameter values representing particular working states of the machine tool and corresponding appropriate values of said control signal, said stored values constituting the said predetermined data, and the processing means further including comparison and interpolation means arranged to compare the current values of said working state parameters as represented by said transducer output signals with said stored parameter values and to interpolate accordingly between said stored values of the control signal in order to derive the said control signal value appropriate to the current working state of the machine tool.

3. The compensating arrangement claimed in claim 1, wherein the said memory means of said signal processing means is arranged to store said predetermined data as a formula expressing said appropriate control signal value as a function of working state parameter values, the processing means being arranged to determine said current appropriate value of the control signal by combining together said current values of the working state parameters in accordance with said formula.

4. The arrangement claimed in claim 1, wherein the memory means of said signal processing means is further arranged to store predetermined data relating said working-state parameter values to residual values of the component deviations remaining uncancelled following operation of said physically acting device, the processing means being arranged to output signals representative of the said residual values which correspond to the current working state of the machine tool as represented by said transducer output signals, and said arrangement further comprising:

subtractor means connected to receive both the transducer output signals representing the coordinate positions of the carriage means and the residual-value signals from the processing means, said subtractor mean being operative to output difference signals corresponding to the difference between the said signals received thereby and representing coordinate positions of said carriage means corrected for said residual values; and a controller connected to receive said difference signals and arranged to enable adjustment of the positioning of the said carriage means in dependence on said difference signals whereby to effect cancellation of the remaining deviation components.

5. The arrangement claimed in claim 4, wherein the said controller comprises a display unit arranged to display the corrected carriage coordinate positions whereby to enable operator-controlled adjustment of the positioning of the carriage means to desired coordinate positions.

6. The arrangement claimed in claim 4, wherein the said controller comprises a numerically controlled governing unit with a feedback input, a demand input, and a control output, said feedback input being connected to receive said difference signals, said demand input being arranged to receive desired coordinate position values of said carriage means, and said control output being connected to drive means operative to effect displacement of said carriage means, the governing unit being arranged to automatically adjust the positioning of said carriage means until the values of the signals at its inputs correspond.

7. In a machine tool installation, an arrangement for increasing the precision of a machine tool by compensating for angular and linear component deviations in tool positioning caused by factors which vary in their effect in dependence on the current working state of the machine tool, said arrangement comprising:

mechanical force generator means responsive to an input control signal fed thereto to physically act upon the machine tool in a manner such as to cancel component deviations, sensor means connected to said machine tool and arranged to generate output signals representative of the current angular and linear working state of the machine tool, electronic signal processing means connected to receive said output signals and including memory means arranged to store predetermined data interrelating said working state parameter values with corresponding control signal values being determined values of the machine working state dependent upon particular working conditions appropriate to cause the cancellation of said component deviations, the processing means being operative to utilize and compare said predetermined data to form said control signal with a value appropriate for the current working state of the machine tool as represented by said sensor output signals, and means feeding said control signal from said processing means to said mechanical force generator means physically acting on the machine tool to compensate for both angular and linear displacements of the machine tool.

* * * * *

UNITED STATES PATENT AND TRADEMARK OFFICE
CERTIFICATE OF CORRECTION

PATENT NO. : 4,354,404
DATED : October 19, 1982
INVENTOR(S) : Francesco COTTA RAMUSINO It is certified that error appears in the above—identified patent and that said Letters Patent is hereby corrected as shown below:

In The Heading of the patent, under the category "[73] Assignee:"

change    "Innocenti Santeustacchio S.p.A., Franchi, Italy" to

-- Innocenti Santeustacchio S.p.A., Brescia, Italy --

Signed and Sealed this

Twenty-first Day of June 1983

[SEAL]

Attest:

DONALD J. QUIGG

Attesting Officer

Acting Commissioner of Patents and Trademarks